Oct. 22, 1968   H. F. FROHBACH ET AL   3,407,401
REFLECTIVE ELECTRICAL OSCILLATING DISPLAY DEVICE
Filed Jan. 22, 1965
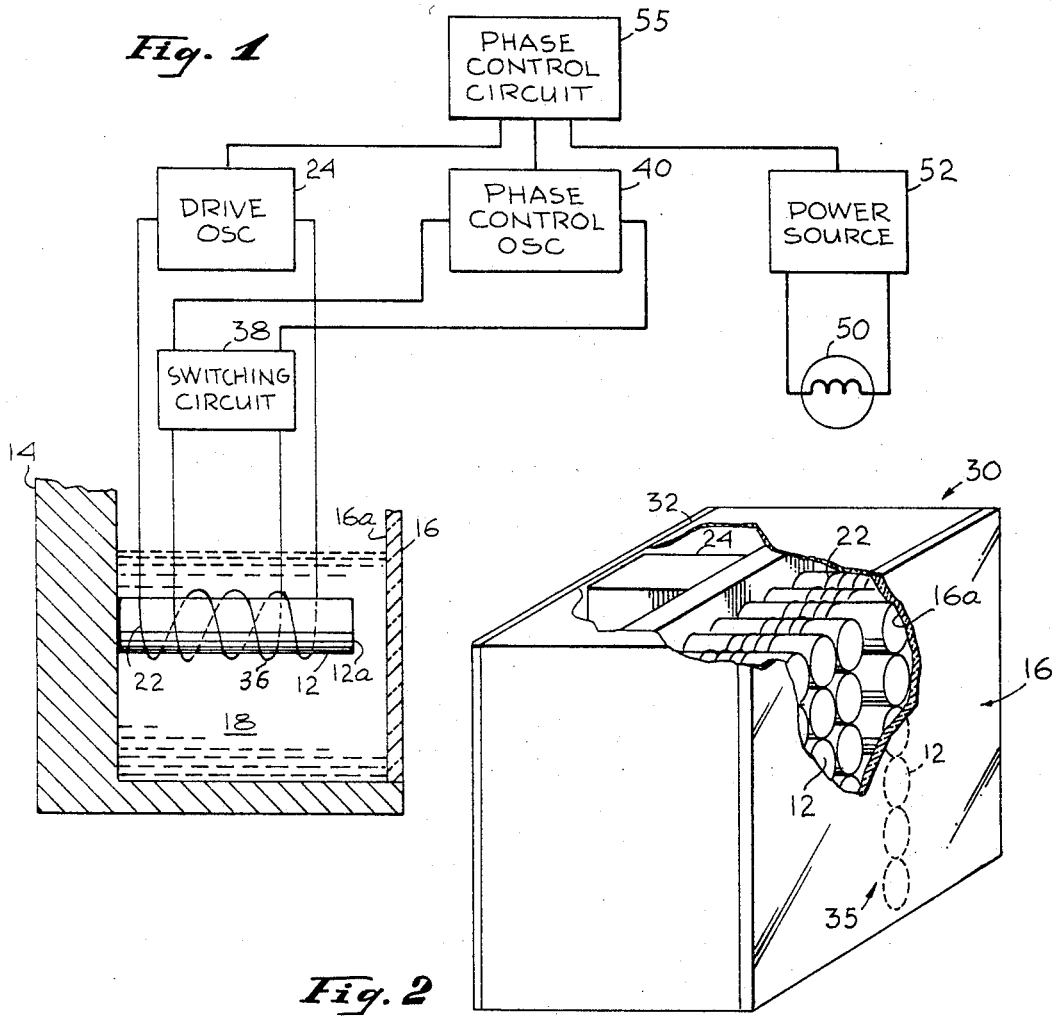
Fig. 1
Fig. 2
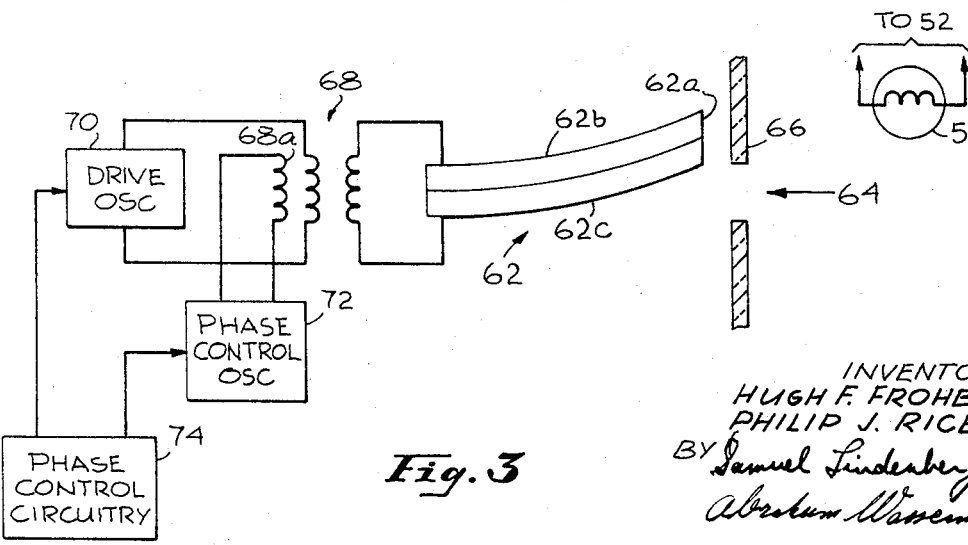
Fig. 3
INVENTORS
HUGH F. FROHBACH
PHILIP J. RICE
BY Samuel Lindenberg
Abraham Wasserman
ATTORNEYS ര
United States Patent Office 3,407,401
Patented Oct. 22, 1968

3,407,401
REFLECTIVE ELECTRICAL OSCILLATING DISPLAY DEVICE
Hugh F. Frohbach, Sunnyvale, and Philip J. Rice, Atherton, Calif., assignors to Stanford Research Institute, Menlo Park, Calif., a corporation of California
Filed Jan. 22, 1965, Ser. No. 427,232
8 Claims. (Cl. 340—324)

ABSTRACT OF THE DISCLOSURE

A display system consisting of a liquid-tight housing with a transparent side thereof, serving as a display panel. The housing contains an opaque white liquid and a matrix of oscillatory-type elements, each with a black end disposed adjacent and apart from the panel. A drive assembly is included to oscillate all the elements so that at a first portion of each cycle of oscillation, all the black ends abut the panel and are visible therethrough, to present a black surface. Control means are provided to vary the phase of oscillation of selected elements so that the ends of only the selected elements abut the panel at a second portion of each cycle, to produce a black pattern on a white background. The pattern configuration is a function of the relative locations of the selected elements in the matrix.

---

This invention relates to a display system and, more particularly, to a system which produces a display as a function of the oscillatory characteristics of a plurality of electromechanical elements.

Systems presently used to display various patterns or designs may be divided into several major types. The most common type is a fixed display, such as the conventional billboard on which a fixed pattern is mounted for display. Some displays are power driven, so that portions of the display surface move with respect to one another in order to produce a display of changing patterns. In still another type of display, a plurality of light sources, such as light bulbs, are arranged in a matrix, generally of rows and columns. By selectively energizing the bulbs, light patterns are produced which can easily be altered by changing the particular group of bulbs which are energized.

Due to the large number of light sources utilized in such a display arrangement, the system must be frequently maintained, in order to replace burned out bulbs, so that the desired light patterns may be produced without gaps therein. Furthermore, the usefulness of such light displays is limited to nighttime.

None of the prior art display systems provide an arrangement whereby a display of varying patterns can be conveniently produced without the use of many light sources which are time limited and expensive to maintain.

Accordingly, it is an object of the present invention to provide a display system wherein changing patterns are conveniently produced without the use of multi-light sources.

Another object of the present invention is to provide a novel arrangement wherein oscillating patterns are produced on a substantially stationary display surface without the use of a plurality of light sources.

Yet another object of the present invention is to provide a novel arrangement in which a single light source is used in conjunction with a plurality of oscillating members to produce, on a stationary surface, an oscillating pattern which can be conveniently altered.

A further object of the present invention is to provide a novel display system which is relatively inexpensive to maintain, in which oscillating members produce a pattern which is repeated at a selected rate and which may be conveniently changed.

These and other objects of the invention are achieved in a display system which consists of a plurality of oscillating elements arranged in a matrix and positioned adjacent a display surface. The oscillating elements are driven by a common source, so that they are all in the same oscillating relationship with respect to the display surface. A pattern is created by altering the oscillatory conditions, such as phase of oscillation, of certain of the elements with respect to the rest of the elements, so that a pattern is repetitively produced on the display surface at a rate equal to the rate of oscillation.

A flashing light source may be synchronized with the source used to drive the elements, so that light flashes on only when particular ones of the elements are in a selected position with respect to the display surface. Thus, the particular ones of the oscillatory elements produce on the display surface a stationary pattern. By changing the particular elements, which oscillate at a different phase relative to the rest of the elements, a different pattern is created. Consequently, the problem of changing displayed patterns is greatly simplified. Furthermore, the use of a single light source greatly reduces the maintenance requirements, resulting in a less expensive system to maintain and operate.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a side view of one embodiment of the display system of the present invention;

FIGURE 2 is an isometric view of the arrangement shown in FIGURE 1; and

FIGURE 3 is a side view of another embodiment of the display system of the present invention.

Reference is now made to FIGURE 1 which is a side view of a single oscillating element used in the embodiment of the invention, and which is diagrammed for explanatory purposes. A magnetostrictive rod 12 is mounted within a liquid-tight display housing 14 having a front transparent display plate 16. The rod 12 is mounted with its longitudinal axis perpendicular to the transparent display 16, with the free end 12a of the rod being spaced only a small distance from the internal side 16a of the display plate 16. The end 12a is assumed to be painted black. The display housing is filled with a white liquid 18, which also fills the space between the surface 16a and the rod's end 12a, so that even though the display plate 16 is transparent, the black end 12a of the rod 12 is obscured from an observer viewing the display plate. All that the observer sees is a white display plate.

The magnetostrictive rod 12 is wound with a winding 22 connected to a controlled driving oscillator 24. Due to the magnetostrictive characteristics of the rod 12, it oscillates or vibrates as a function of a magnetic field applied along its longitudinal axis. The magnetic field may be produced by current in the winding 22 supplied from the driving oscillator 24. The oscillator 24 is controlled to supply current so that the rod 12 oscillates at a predetermined rate, with the end 12a abutting against the surface 16a once during each cycle of oscillation. Every time the rod's end 12a abuts, or is in contact with, the surface 16a, the observer sees a black area on the otherwise white display plate, the shape of the area being the same as that of the cross section of the rod 12.

Reference is now made to FIGURE 2 which is an isometric view of a display system 30, operating in accordance with the teachings of the present invention. Portions of the display 16 and a top cover plate 32 of the system 30 are removed. As seen, in the display system 30 a plurality of magnetostrictive rods all designated by numeral 12 are arranged in a plurality of rows and columns. The free black ends of the rods 12 are mounted adjacent the internal side 16a of the display plate 16. Each of the rods is wound with a winding 22 which is connected to the oscillator 24. In light of the foregoing description, it is thus seen, that the oscillator 24 may be used to control the current in all the windings 22 so that all the rods oscillate in phase. Consequently, once during every cycle of oscillation all the free ends of the rods abut against side 16a, so that an observer viewing the display plate 16 sees the black areas of the ends thereof on the display plate. In practice, the rods are mounted quite close to one another, so that the entire display plate turns black, once during each cycle of oscillation. As long as all rods oscillate in phase, the entire display plate which otherwise appears white, will turn black during a particular part of each cycle of oscillation.

The phase of oscillation of any of the rods may be altered with respect to the phase of oscillation of the rest of the rods, so that at a given time during each cycle of operation, only particular rods abut or are in contact with the display plate. For example, let it be assumed that the rods in column 35 (FIGURE 2) oscillate in the same phase but one which differs from that of the rest of the rods. Then, it is apparent that once during each cycle of oscillation when the black ends of the rods in column 35 abut against the side 16a, an apparently black vertical line on a white background will be seen on the display plate 16. Also, during each cycle, when the black ends of all the rods, except those of rods in column 35, abut against the side 16, a white line on an otherwise black background will be created.

It is thus seen, that the pattern created is a function of the positions within the matrix of the rods which are caused to oscillate at a different phase than the rest of the rods. The phase at which each rod oscillates with respect to the other rods may be controlled by means of a second winding 36 (FIGURE 1) wound about each rod. The winding 36 hereinafter also referred to as the phase controlling winding is connected through a switching circuit 38 to a phase control oscillator 40.

As long as a current is not supplied from the oscillator 40 to any of the windings 38, all the rods (FIGURE 2) will continue to oscillate in phase as hereinbefore described. However, when a current is supplied to the windings 36 associated with any of the rods, the phase of oscillation of these rods will change with respect to the rest of the rods in the matrix. Thus, the current from the oscillator 40 is used to control the phase of oscillation of a group of rods with respect to the phase of oscillation of the rest of the rods. The selected rods which have their phase of oscillation affected by oscillator 40, continue to oscillate in the same phase so that their free ends come in contact with the display plate 16 at the same time during each cycle of oscillation and thereby produce a black pattern thereon.

It should be apparent from the foregoing, that the pattern produced on the display plate depends on the particular rods selected to oscillate in phase. This is conveniently accomplished by means of the switching circuit 38, which is operated to control the coupling of the oscillator 40 to the windings 36 of the particular group of rods which are to produce the desired pattern. The pattern may conveniently be altered by controlling the circuit 38 to switch the current from oscillator 40 to windings 36 of a different set of rods within the matrix. By continuously charging the rods which are in the same phase of oscillation, a continuously changing pattern may be produced. The switching circuit may be operated according to any known switching technique so that at any given time the phase controlling oscillator 40 is inductively coupled only to a select group of oscillating rods.

From the foregoing it is apparent that the patterns produced on the display plate are created by rods or elements which oscillate in phase, so that once during each cycle their free ends are in contact with the display plate. As a result, a pattern which may be seen by an observer is produced thereon.

In a preferred arrangement, the oscillatory elements are chosen to oscillate or vibrate at a frequency which is one-half of the frequency of the driving oscillator, such as oscillator 24. Oscillator 24 and phase control oscillator 40 are synchronized by means of a phase control circuit 55 (FIGURE 1). The elements are controlled so that those elements which are not used to form the desired pattern lock in with every other cycle of oscillation of the driving oscillator, while those elements which form the desired pattern lock in with every succeeding cycle of oscillation. Thus, for explanatory purposes, the elements may be thought of as oscillating in a first phase with respect to the driving frequency, and those elements which are to form the pattern are affected so that they oscillate in a different, or second phase.

If the rate of oscillation is quite small, the fact that the pattern is oscillatory may not be disturbing. For example, in the foregoing description a black pattern on a white background will be produced during a portion of each oscillatory cycle, while a white pattern on an otherwise black background will be created during another portion of each cycle. However, if the rate of oscillation exceeds that which the human eye can distinguish, the oscillatory pattern will appear blurred, unless it is made to appear stationary.

According to the teachings of the present invention, additional means are provided which convert the oscillating pattern to a seemingly stationary one. This is accomplished by means of a light bulb 50, connected to a power source 52 which together with oscillators 24 and 40 is connected to the phase control circuit 55. The light bulb 50 is synchronized to flash on the instant that the rods creating the desired pattern are in contact with the display plate. Thus, the flashing light bulb 50 acts as a stroboscope so that the oscillating pattern appears to be stationary. However, the particular oscillating pattern may be changed by means of the switching circuit 38, as hereinbefore described.

Reference is now made to FIGURE 3 which is a side view of another oscillating element which can be incorporated in a display system of the present invention. As seen in FIGURE 3 a piezoelectric device 62, also known as a bimorph, having an end 62a painted white is mounted adjacent an opening 64 in an otherwise black display surface 66. A bimorph comprises two piezoelectric plates (shown in FIGURE 3 as 62b and 62c) connected together in such a way that when potential signals are applied to them, one plate tends to expand and the other to contract, thus producing a bending of the combination. The bimorph 62 is shown connected through a transformer 68 to a driving oscillator 70. The electrical signals from oscillator 70 are adjusted so that at one extreme of the motion of the bimorph, the white end 62a is hidden behind the black display surface 66, as shown in FIGURE 3. However, at the other extreme of its motion, the end 62a appears at the opening 64 so that the white end is observable through the display plate.

A plurality of such elements may be closely spaced in a matrix of rows and columns, similar to that shown in FIGURE 2. As long as all the elements are excited in phase, at one point during each oscillatory cycle the white ends of all the elements will appear at their respective openings on the display surface 66. Thus, if the light bulb 50 is turned on at the same time, the display surface will appear white. The phase of oscillation of any group of bimorphs with respect to the driving oscillator 70 can be changed so that these particular elements oscillate at a new phase. As a result, at one point during each cycle a white pattern is created on the otherwise black display surface 66. The pattern is made to appear stationary by synchronizing the light bulb 50 to flash on whenever the white ends of the particular elements are opposite their respective openings in the display surface.

The phase of oscillation of any of the bimorphs with respect to the driving oscillator 70 or the other elements may be controlled by applying a short electrical pulse or signal at a selected time. Such a signal may be produced in an auxiliary winding 68a of the transformer 68 (FIGURE 3), the winding being connected to a phase controlling circuit 72, which is synchronized with oscillator 70 in a phase control circuit 74 to energize the winding 68a at the desired time. The element, the phase of oscillation of which has been changed, will continue to oscillate in its new phase relationship until further perturbed. Thus, selected elements can be caused to reverse phase and present a white face during illumination and thereby produce patterns on the display surface.

Summarizing briefly, the present invention provides a system, wherein a plurality of oscillating elements are driven from a common source so as to oscillate or vibrate at a selected rate. Means are provided to alter the phase of oscillation of any of the elements with respect to the phase of oscillation of the other elements, so that at any given time, that group of elements oscillates in phase which has their cross sections in the form of a desired pattern. As a result, once during each oscillatory cycle the elements which oscillate in phase are at a selected positional relationship with respect to a display surface so that the pattern created by their cross-sections is produced thereon.

A flashing light synchronized with the elements may be incorporated to convert the oscillatory pattern to a seemingly stationary one. The displayed pattern which seems stationary due to the stroboscopic effect of the flashing light may conveniently be altered by merely changing the particular elements which oscillate in phase with the flashing light. Thus, a novel system is provided by which changing patterns are displayed without the need to move major portions of the display surface with respect to one another. Furthermore, the display system of the invention eliminates the need for a great many light bulbs, thus greatly reducing the need for frequent maintenance.

In the foregoing description the means for illuminating the display, such as the light bulb 50, is shown mounted on the front of the display plate. However, it should be appreciated that the bulb may be positioned behind the plate or display panel, with the vibrating elements being used to close or open the apertures in the display panel to enable light to pass therethrough.

It should be apparent to one familiar with the art that modifications may be introduced in the arrangements as hereinbefore described without departing from the true spirit of the invention. For example, the particular oscillating elements chosen may differ from those shown. Also the manner in which they oscillate with respect to the display surface may be changed without departing from the teachings disclosed herein. Similarly, various techniques presently known in the art may be used to vary the phase of oscillation of some of the elements with respect to the rest so that only a select group of elements oscillate in a selected phase with which the flashing light is synchronized.

Accordingly, all such modifications and equivalents are deemed to fall within the scope of the present invention as claimed in the appended claims.

What is claimed is:

1. A display system comprising:

a liquid-tight housing having a transparent display panel as one side thereof;

an opaque liquid of a first color in said housing;

a plurality of elements positioned in said housing and arranged in a matrix of rows and columns, each element having an end of a second color, distinguishable from said first color, the position of the element end being variable between a first position in which the end is spaced apart from said panel with said liquid therebetween so that the element end is not viewable through the panel and a second position in which the element end is substantially in contact with the display panel so that its colored end is seen thereat; and means for controlling selected ones of said elements so that their end positions oscillate between said first and second positions.

2. A system for displaying a pattern on a display surface, by controlling the phase of oscillation of selected oscillating elements with respect to the phase of oscillation of other elements, so that at a finite portion of each oscillatory cycle only said selected oscillating elements are at a desired position with respect to the display surface, thereby producing a displayable pattern thereon comprising a display panel having first and second sides, and defining a plurality of openings extending through said sides, said openings being arranged in a matrix of closely spaced rows and columns and said second panel side is of a first color; a plurality of elements each having a free end of a second color distinguishable from said first color mounted adjacent a different one of said openings and observable through the opening from said second side of said display panel when said element end is aligned with its respective opening; driving means for energizing said elements to oscillate at a selected rate in a direction substantially parallel to said display panel so that the ends of all elements are aligned with their respective openings during a first portions of each cycle of oscillation; control means for selectively energizing a group of said elements to vary their phase of oscillation so that only the ends of elements in said group are aligned with their respective openings during a second portion, distinguishably different from said first portion of each cycle of oscillation, the ends of said elements in said group of said second color being observable through said display panel during said second portion of each cycle of oscillation, for producing an oscillatory pattern in said second color on said second side thereof, the pattern configuration being a function of the relative positions of the elements in said group of elements within said matrix of rows and columns; and switching means for controlling the elements which are selectively energized by said control means so as to control the configuration of said pattern.

3. A display system as recited in claim 2 including means synchronized with said driving and control means for flashing light at said display panel so that said displayed oscillating pattern appears non-oscillatory, said oscillating elements having piezoelectric characteristics, and said driving means include means for applying potential signals to said element, whereby each element to which potential signals are applied bends so that its end is aligned with its respective opening at either said first or said second cycle portion.

4. A system for displaying a pattern on a display panel by controlling the phase of oscillation of selected oscillating elements with respect to the phase of oscillation of other elements so that at a first selected time during each oscillatory cycle only said selected oscillating elements are at a desired position with respect to the display panel for producing a displayable pattern thereon comprising a liquid-tight housing having a transparent display panel as one side thereof; an opaque liquid of a first color in said housing; a plurality of elements positioned in said housing and arranged in a matrix of rows and columns, the elements having ends spaced apart from said transparent display panel, each end being of a second color distinguishable from said first color and at a distance from said panel so as not to be visible thereat through the liquid between the end and said panel; oscillatory driving means for energizing said elements to oscillate so that their ends are in contact with said transparent display panel during a first selected portion of each cycle of oscillation when all the ends are viewable through said panel; control means for controlling said elements so that the ends of only a group of said elements are in contact with said display panel during a second portion, different from said first portion of each cycle of oscillation, to produce once each cycle a pattern in said second color which is observable through said transparent display panel when the ends of said group of elements are in contact with said transparent display panel, said pattern being a function of the relative positions of the elements in said group of said matrix of rows and columns.

5. A display system as recited in claim 4 wherein said first and second selected portion of each cycle being half a cycle apart, said system including switching means for controlling the elements included in said group of elements, so as to control the configuration of said pattern.

6. A display system as recited in claim 5 including light means synchronized with said oscillatory driving means and said control means for flashing light on said transparent display surface when said oscillatory pattern is produced thereon so that said pattern appears non-oscillatory.

7. A display system as recited in claim 5 wherein the liquid color is white and wherein each of said elements comprises a magnetostrictive rod, having a black end which contacts said display panel during each cycle of oscillation.

8. The system as defined in claim 2 wherein said elements have piezoelectric characteristics and said driving means provide potential signals to said elements to bend them about axes parallel to said display panel whereby each element is bendable between one position in which the colored end thereof is aligned with its respective opening and another position in which the end is not aligned with the opening so that it is not viewable therethrough.

References Cited

UNITED STATES PATENTS

| 1,069,582 | 8/1913 | Schaefer | 340—373 |
| 1,975,876 | 10/1934 | Stern. | |
| 3,146,367 | 8/1964 | McNaney | 350—269 X |

FOREIGN PATENTS 897,306   5/1962   Great Britain.

DAVID SCHONBERG, *Primary Examiner.*

T. H. KUSMER, *Assistant Examiner.*